United States Patent [19]

Meyer et al.

[11] Patent Number: 5,506,315
[45] Date of Patent: Apr. 9, 1996

[54] PREPARATION OF COPOLYMERS OF MONOETHYLENICALLY UNSATURATED MONOMERS CONTAINING ACID GROUPS AND N-VINYLLACTAMS

[75] Inventors: Harald Meyer, Deidesheim; Walter Denzinger, Speyer; Axel Sanner, Frankenthal; Heinrich Hartmann, Limburgerhof, all of Germany

[73] Assignee: BASF Aktiengesellschaft, Ludwigshafen, Germany

[21] Appl. No.: 295,680

[22] PCT Filed: Mar. 3, 1993

[86] PCT No.: PCT/EP93/00478

§ 371 Date: Sep. 12, 1994

§ 102(e) Date: Sep. 12, 1994

[87] PCT Pub. No.: WO93/18073

PCT Pub. Date: Sep. 16, 1993

[30] Foreign Application Priority Data

Mar. 12, 1992 [DE] Germany .......................... 42 07 900.4

[51] Int. Cl.$^6$ .......................... C08F 2/10; C08F 226/06; C08F 226/10; C08F 220/04; C08F 220/10
[52] U.S. Cl. .......................... 526/89; 526/264; 526/318.4; 526/328.5
[58] Field of Search .......................... 526/89, 264, 318.4, 526/328.5

[56] References Cited

U.S. PATENT DOCUMENTS

| | | |
|---|---|---|
| 2,676,949 | 4/1954 | Morner et al. . |
| 3,405,084 | 10/1968 | Bohae et al. . |
| 4,424,079 | 1/1984 | Barabas . |
| 4,595,737 | 6/1986 | Straub et al. . |
| 4,709,759 | 12/1987 | Bock et al. . |
| 4,711,726 | 12/1987 | Pierce et al. . |
| 4,786,699 | 11/1988 | Nuber et al. . |
| 5,011,895 | 4/1991 | Shih et al. . |
| 5,232,603 | 8/1993 | Denzinger et al. .................... 210/698 |

FOREIGN PATENT DOCUMENTS

| | | |
|---|---|---|
| 922378 | 5/1954 | Germany . |
| 215379 | 4/1986 | Germany . |
| WO90/12047 | 10/1990 | WIPO . |
| WO91/00302 | 1/1991 | WIPO . |

*Primary Examiner*—Joseph L. Schoffer
*Assistant Examiner*—Wu C. Cheng
*Attorney, Agent, or Firm*—Oblon, Spivak, McClelland, Maier & Neustadt

[57] ABSTRACT

Copolymers are prepared from monoethylenically unsaturated monomers containing acid groups and N-vinyllactams and, if required, other monoethylenically unsaturated monomers by copolymerization of monomers in the presence of free radical polymerization initiators by a solution polymerization method in water at a pH of at least 6, by a process in which an alkali metal base or an alkaline earth metal base or a mixture thereof is used for establishing the pH of the aqueous reaction solution.

11 Claims, No Drawings

PREPARATION OF COPOLYMERS OF MONOETHYLENICALLY UNSATURATED MONOMERS CONTAINING ACID GROUPS AND N-VINYLLACTAMS

The present invention relates to a process for the preparation of copolymers of (a) monoethylenically unsaturated monomers containing acid groups, (b) N-vinyllactams and, if required, (c) other monoethylenically unsaturated monomers by copolymerization of monomers in the presence of free radical polymerization initiators.

U.S. Pat. No. 2,676,949 discloses Copolymers of maleic anhydride and N-vinyllactams, which are prepared with the aid of precipitation polymerization in benzene in the presence of compounds forming free radicals. Terpolymers of N-vinylpyrrolidone, $C_1$–$C_{10}$-acrylates and acrylic acid or methacrylic acid are disclosed in U.S. Pat. No. 3,405,084. The polymerization is carried out in anhydrous ethanol. The polymer solution thus obtained is neutralized with organic amines and used as an additive for hairspray formulations.

U.S. Pat. No. 4,424,079 discloses that copolymers of maleic anhydride and N-vinylpyrrolidone, which are prepared by precipitation polymerization in methylene chloride or toluene, can be used as rust removers. According to EP-A-0 205 451, copolymers of N-vinylpyrrolidone and maleic anhydride are obtained by polymerization by a precipitation polymerization method in an organic solvent in which the monomers are soluble but the resulting copolymer is insoluble.

U.S. Pat. No. 4,709,759 discloses the preparation of a copolymer of acrylamide, N-vinylpyrrolidone and N-n-octylacrylamide in water by emulsion polymerization. The acrylamide content of the copolymers is hydrolyzed with formation of acrylic acid units. These polymers are used for the recovery of mineral oil from oil-containing water.

U.S. Pat. No. 4,711,726 discloses copolymers of (meth)acrylic acid and vinylpyrrolidone. These copolymers are used as incrustation inhibitors and rust inhibitors in boilers.

U.S. Pat. No. 4,595,737 relates to a process for the preparation of water-soluble terpolymers of N-vinyllactams, acrylic acid or salts thereof and $C_1$–$C_4$-alkyl vinyl ethers. The copolymerization is carried out in inert organic solvents.

U.S. Pat. No. 5,011,895, WO-A-90/12041 and WO-A-91/00302 describe precipitation polymerizations of N-vinyllactams, acrylic acid and, if required, further monomers in saturated $C_3$–$C_{10}$-aliphatic hydrocarbons. According to J. Polym. Sci. 23 (1958), 377–379, acrylic acid and vinylpyrrolidone can be polymerized not only in propanol, benzene, toluene, xylene, dioxane, chloroform, carbon tetrachloride and petroleum ether but, with particularly good results, also in tetrahydrofuran.

DE-B-922 378 dicloses a process for the preparation of polymerization products from N-vinyllactams, in which the polymerization of N-vinyllactams is carried out with or without other monoethylenically unsaturated monomers in aqueous solution in the presence of hydrogen peroxide, and ammonia, water-soluble amines or salts of these substances are added during the polymerization. The use of sodium hydroxide or sodium bicarbonate instead of ammonia or amines in the copolymerization greatly delays the initiation of the polymerization.

EP-B-215 379 discloses a process for the preparation of polyvinylpyrrolidone, in which the polymerization of vinylpyrrolidone is carried out in aqueous solution at a pH of from 7 to 11 in the presence of heavy metal ions or of a mixture of a heavy metal salt and a heavy metal complexing agent. Sodium hydroxide solution, potassium hydroxide solution or carbonates or bicarbonates thereof are used for establishing the pH.

It is an object of the present invention to provide a simpler process for the preparation of copolymers of monomers containing acid groups and N-vinyllactams.

We have found that this object is achieved, according to the invention, by a process for the preparation of copolymers of (a) monoethylenically unsaturated monomers containing acid groups, (b) N-vinyllactams and, if required, (c) other monoethylenically unsaturated monomers by copolymerization of the monomers in the presence of free radical polymerization initiators, if the copolymerization is carried out by a solution polymerization method in water at a pH of at least 6 and an alkali metal base or alkaline earth metal base or a mixture thereof is used for establishing the pH of the aqueous monomer solution, the free radical initiators having a half life of less than 3 hours at the chosen reaction temperature. The amount of monomer which is used in the copolymerization is from 5 to 95% by weight for monomer (a), from 95 to 5% by weight for monomer (b) and from 0 to 30% by weight for monomer (c).

The aqueous polymer solutions thus obtainable may be used, for example, as additives for hairsprays, as lubricant additives, as structure improvers for arable soils, as rust inhibitors or rust removers for metal surfaces, as boiler scale inhibitors or boiler scale removers, as agents for recovering mineral oil from oil-containing water, as agents for releasing active ingredients, as cleaning agents for wastewaters, as adhesive raw materials, as detergent additives and as assistants in the photographic industry and in cosmetic formulations.

It could not be foreseen that salts of monoethylenically unsaturated carboxylic acids are copolymerizable with N-vinyllactams in aqueous systems, because it is in fact known that N-vinyllactams, such as N-vinylpyrrolidone, are unstable in aqueous solutions under the influence of weak acids (cf. J. Ferguson and V.S. Rajan, Eur. Polym. Journ. 15 (1979), 627, and Kühn and Birett, Merkblätter gefährlicher Arbeitsstoffe V10, V12.

Suitable monomers of group (a) are monoethylenically unsaturated compounds which contain at least one acid group, for example a carboxyl group or a sulfo group. Compounds of this type are, for example, acrylic acid, methacrylic acid, dimethacrylic acid, ethylacrylic acid, crotonic acid, allylacetic acid and vinylacetic acid. Monoethylenically unsaturated dicarboxylic acids, such as maleic acid, fumaric acid, itaconic acid, mesaconic acid, methylenemalonic acid, citraconic acid, maleic anhydride, itaconic anhydride and methylenemalonic anhydride, are also suitable, the anhydrides being hydrolyzed to the corresponding dicarboxylic acids when introduced into water. Other suitable monomers of group (a) are sulfo-containing monomers, such as 2-acrylamido-2-methylpropanesulfonic acid, vinylsulfonic acid, methallylsulfonic acid or allylsulfonic acid, and/or monomers containing phosphonic acid groups, such as vinylphosphonic acid. The monomers of group (a) may be used either alone or as mixtures with one another. These monomers may be added to the polymerization zone either in the form of the free acids or, preferably, in the form of aqueous solutions of their alkali metal or alkaline earth metal salts. From this group of monomers, acrylic acid, methacrylic acid, maleic acid, itaconic acid and fumaric acid are particularly preferably used, the use of the corresponding lithium, sodium, potassium, magnesium, calcium or strontium salts as monomers of group (a) being very particularly preferred. The salts of the monoethylenically unsaturated monomers containing acid groups are prepared by adding alkali metal or alkaline earth metal hydroxides or alkali metal or alkaline earth metal carbonates or bicarbonates to aqueous solutions of the free acids.

Particularly suitable monomers of the group (b) are N-vinylpyrrolidone, N-vinylpiperidone and N-vinylcaprolactam.

The monomers of group (b) may be used either alone or as a mixture in the copolymerization.

Monomers of group (c) which may be concomitantly used in the copolymerization of the monomers (a) and (b) are, for example, all other monomers which are copolymerizable with monoethylenically unsaturated carboxylic acids and N-vinyllactams, such as methyl acrylate, methyl methacrylate, ethyl acrylate, diethyl maleate, N-vinylimidazole, dimethylaminoethyl acrylate, dimethylaminoethyl methacrylate, dimethylaminopropylmethacrylamide, methyl isobutyl ether or mixtures of the stated compounds. Further examples of such monomers are n-butyl acrylate, hydroxyethyl acrylate, hydroxyethyl methacrylate, hydroxypropyl acrylate, hydroxypropyl methacrylate, hydroxybutyl acrylate, hydroxybutyl methacrylate, monomethyl maleate, dimethyl maleate, monoethyl maleate, diethyl maleate, acrylamide, methacrylamide, N-methylacrylamide, N,N-dimethylacrylamide, dimethylaminopropylmethacrylamide, N-vinyl-2-methylimidazole, vinyl formate, vinyl acetate, vinyl propionate, vinyl methyl ether, vinyl ethyl ether, vinyl dodecyl ether, vinyl hexadecyl ether and vinyl octadecyl ether, as well as the salts and quaternization products of the vinylimidazoles and basic (meth)acrylates.

The monomer mixtures used in the copolymerization contain the monomers (a) in an amount of from 5 to 95% by weight, the monomers (b) in an amount of from 95 to 5% by weight and the monomers (c) in an amount of from 0 to 30% by weight. Copolymers comprising from 5 to 95% by weight of acrylic acid or methacrylic acid and from 95 to 5% by weight of N-vinylpyrrolidone or N-vinylcaprolactam, based in each case on the total weight of the monomers, are preferably prepared. The polymerization is carried out, according to the invention, in aqueous solution or in aqueous alcoholic solutions which may contain up to 75% by weight of a $C_1$–$C_4$-alcohol. If aqueous alcoholic solutions are used as the polymerization medium, the alcohol preferably used is methanol or ethanol. The concentration of the polymers in the aqueous reaction mixture is usually from 10 to 70, preferably from 15 to 50% by weight. The pH of the aqueous solution is at least 6, preferably from 7 to 9, an alkali metal base or alkaline earth metal base or a mixture thereof being used to establish the pH of the aqueous reaction solution. It is simplest here to use the monomers of group (a) as aqueous solutions of the alkali metal or alkaline earth metal salts, having a pH of at least 6. However, it is also possible to add the monomers of group (a) in unneutralized form to the reaction mixture and at the same time to add at least an equivalent amount of an alkali metal base or alkaline earth metal base in order to keep the pH of the reaction mixture in the desired region of 6 or above 6.

The polymerization is usually carried out at from 40° to 150° C., preferably from 60° to 100° C., in the presence of free radical initiators. The polymerization initiators are usually used in amounts of from 0.01 to 20, preferably from 0.05 to 10% by weight, based on the monomers.

Preferred free radical initiators are all those compounds which have a half life of less than 3 hours at the particular polymerization temperature chosen. If the polymerization is initiated at a low temperature and completed at a higher temperature, it is advantageous to employ at least two initiators which decompose at different temperatures, ie. first to use an initiator which decomposes at a lower temperature for initiating the polymerization and then to complete the main polymerization with an initiator which decomposes at a higher temperature. Water-soluble and water-insoluble initiators or mixtures of water-soluble and water-insoluble initiators may be used. Water-insoluble initiators can then be metered in pure form or in solution in an organic phase. In the temperature ranges stated below, for example, the initiators mentioned in these ranges may be used:

Temperature: from 40° to 60° C.:
Acetylcyclohexanesulfonyl peroxide, diacetyl peroxydicarbonate, dicyclohexyl peroxydicarbonate, di-2-ethylhexyl peroxydicarbonate, tert-butyl perneodecanoate, tert-amyl perneodecanoate, 2,2'-azobis-(4-methoxy-2,4-dimethylvaleronitrile), 2,2'-azobis-(2-methyl-N-phenylpropionamidine) dihydrochloride, 2,2'-azobis-(2-methylpropionamidine) dihydrochloride, 2,2'-azobis-(2-amidinopropane) dihydrochloride.

Temperature: from 60° to 80° C.:
tert-Butyl perpivalate, tert-amyl perpivalate, dioctanoyl peroxide, dilauroyl peroxide, 2,2'-azobis-(2,4-dimethylvaleronitrile).

Temperature: from 80° to 100° C.:
Dibenzoyl peroxide, tert-butyl per-2-ethylhexanoate, tert-amyl per-2-ethylhexanoate, tert-butyl permaleate, 2,2'-azobisisobutyronitrile, dimethyl 2,2'-azobisisobutyrate, sodium persulfate, potassium persulfate, ammonium persulfate.

Temperature: from 100° to 120° C.:
Bis(tert-butyl peroxide)-cyclohexane, tert-butyl peroxyisopropylcarbonate, tert-butyl peracetate, hydrogen peroxide, tert-amyl peroxy-3,5,5-trimethylhexanoate, tert-butyl peroxy-3,5,5-trimethylhexanoate, ethyl 3,3-di-(tert-amylperoxy)-butyrate.

Temperature: from 120° to 140° C.:
2,2-Bis-(tert-butylperoxy)-butane, dicumyl peroxide, di-tert-amyl peroxide, di-tert-butyl peroxide.

Temperature: >140° C.:
p-Menthane hydroperoxide, pinane hydroperoxide, cumyl hydroperoxide and tert-butyl hydroperoxide.

If, in addition to the stated initiators, salts or complexes of heavy metals, for example copper, cobalt, manganese, iron, vanadium, nickel and chromium salts, or organic compounds, such as benzoin, dimethylaniline or ascorbic acid, are also used, the half lives of the stated free radical initiators can be reduced. For example, tert-butyl hydroperoxide can be activated with the addition of 5 ppm of copper(II) acetylacetonate so that polymerization can be carried out at as low as 100° C. The reducing component of redox catalysts may also be formed, for example, by compounds such as sodium sulfite, sodium bisulfite, sodium formaldehyde sulfoxylate and hydrazine. From 0.01 to 20, preferably from 0.05 to 10% by weight, based on the monomers used in the polymerization, of a polymerization initiator or of a mixture of a plurality of polymerization initiators are used. From 0.01 to 15% by weight of the reducing compounds are added as redox components. Heavy metals are used in an amount of from 0.1 to 100 ppm, preferably from 0.5 to 10 ppm. It is often advantageous to use a combination of peroxide, reducing agent and heavy metal as a redox catalyst.

The molecular weight of the polymers can, if desired, be reduced by adding regulators to the reaction mixture.

Examples of suitable regulators are lower alcohols, such as methanol, ethanol, propanol, n-butanol, isopropanol, isobutanol or pentanol. However, other compounds usually used for this purpose, such as sulfur compounds, for example 2-mercaptoethanol, butyl mercaptan, dodecyl mercaptan, thioacetic acid, thiolactic acid, halogen compounds, such as carbon tetrachloride or 1,1,1-tribromopropane, or formic acid and its derivatives, may also be used as molecular weight regulators. By a suitable choice of regulator, initiator, polymerization temperature and monomer concentration, the K value of the polymer obtained, which is a measure of the molecular weight, is established. The K values of the resulting copolymers are usually from 10 to 300, preferably from 15 to 200, the measurements being carried out in a 1% strength by weight aqueous solution at 25° C.

The copolymers are usually prepared in stirred kettles having anchor, paddle, impeller or multistage impulse countercurrent agitators. If it is intended to employ high concentrations or to synthesize polymers having a high K value, it is advantageous to work in kneaders or similar apparatuses. In the preparation, the stated batch may be initially taken in the reactor and the reaction initiated by adding the initiator after the batch has been heated to the desired temperature. In this procedure, however, removal of the heat of polymerization presents problems. Advantageously, therefore, the solvent is initially taken in the reactor and the monomers, or an aqueous or alcoholic solution of the monomers, and initiator are metered in batchwise or continuously. It is often also advantageous for the course of the reaction initially to take the solvent in the reactor and to meter in the monomers, the initiator and the neutralizing agent for maintaining the required pH under the polymerization conditions.

The copolymers obtained have a wide range of uses, for example as lubricant additives, structure improvers for arable soils, hair lacquers and hair spray additives, rust removers for metallic surfaces, rust inhibitors, agents for recovering mineral oil from oil-containing water, boiler scale inhibitors and boiler scale removers, agents for releasing active ingredients, adhesive raw materials, detergent additives, cleaning agents for wastewaters and assistants in the photographic industry and in immunochemicals and cosmetic materials.

The Examples which follow illustrate the invention. The K value is measured in a 1% strength by weight solution in water at 25° C. according to Fikentscher (cf. H. Fikentscher, Cellulose-Chemie 13 (1932), 58–64 and 71– 74; Encyclopedia of Chemical Technology, John Wiley and Sons, 1970, Vol. 21, 2nd Ed., pages 427–428).

EXAMPLE 1

A mixture of 180 g of acrylic acid and 600 g of water is brought to a pH of 7.7 with 205 g of 50% strength by weight aqueous sodium hydroxide solution, and 20 g of N-vinylpyrrolidone are added (feed 1). Feed 2 is prepared from 4.2 g of 2,2'-azobis-(2-methylpropionamidine) dihydrochloride and 96 g of water.

100 ml of water, 250 ml of feed 1 and 5 ml of feed 2 are initially taken in a 2 l stirred container equipped with a stirrer, a heating means, a reflux condenser, a metering apparatus and a gas inlet and outlet and are heated to 60° C. while stirring. At this temperature, the remainder of feed 1 is metered in over 3 hours and the remainder of feed 2 over 3.5 hours. Stirring is then continued for a further 3 hours at this temperature. A clear, viscous polymer solution having a solids content of 22.5% by weight and a hydrogenation iodine number of 1.0 is obtained. The K value of the copolymer is 65.0.

EXAMPLE 2

A mixture of 180 g of methacrylic acid and 600 g of water is brought to a pH of 7.6 with 193 g of 50% strength by weight sodium hydroxide solution, and 20 g of N-vinylpyrrolidone are added (feed 1). Feed 2 is prepared from 4.2 g of 2,2'-azobis-(2-methylpropionamidine) dihydrochloride and 96 g of water.

100 ml of water, 250 ml of feed 1 and 5 ml of feed 2 are initially taken in a 2 l stirred container equipped as in Example 1 and are heated to 60° C. while stirring. At this temperature, the remainder of feed 1 is metered in over 3 hours and the remainder of feed 2 over 3.5 hours. Stirring is then continued for a further 3 hours at this temperature. A clear, viscous polymer solution having a solids content of 23.3% by weight and a hydrogenation iodine number of 1.3 is obtained. The K value of the copolymer is 57.9.

EXAMPLE 3

A mixture of 180 g of maleic acid and 540 g of water is brought to a pH of 8.0 with 260 g of 50% strength by weight sodium hydroxide solution, and 20 g of N-vinylpyrrolidone are added (feed 1). Feed 2 is prepared from 4.2 g of 2,2'-azobis-(2-methylpropionamidine) dihydrochloride and 96 g of water.

100 ml of water, 250 ml of feed 1 and 5 ml of feed 2 are initially taken in a 2 l stirred container equipped as in Example 1 and are heated to 65° C. while stirring. At this temperature, the remainder of feed 1 is metered in over 3 hours and the remainder of feed 2 over 3.5 hours. Stirring is then continued for a further 3 hours at this temperature. A cloudy, slightly viscous polymer solution having a solids content of 25.8% by weight and a hydrogenation iodine number of 3.3 is obtained. The K value of the copolymer is 17.8.

EXAMPLE 4

A mixture of 125 g of acrylic acid, 55 g of maleic acid and 540 g of water is brought to a pH of 7.7 with 225 g of 50% strength by weight sodium hydroxide solution, and 20 g of N-vinylpyrrolidone are added (feed 1). Feed 2 is prepared from 4.2 g of 2,2'-azobis-(2-methylpropionamidine) dihydrochloride and 96 g of water.

100 ml of water, 250 ml of feed 1 and 5 ml of feed 2 are initially taken in a 2 l stirred container equipped as in Example 1 and are heated to 65° C. while stirring. At this temperature, the remainder of feed 1 is metered in over 3 hours and the remainder of feed 2 over 3.5 hours. Stirring is then carried out for a further 2 hours at 70° C. A clear, viscous polymer solution having a solids content of 24.6% by weight and a hydrogenation° iodine number of 0.7 is obtained. The K value of the copolymer is 36.4.

EXAMPLE 5

A mixture of 180 g of acrylic acid and 600 g of water is brought to a pH of 7.7 with 201 g of 50% strength by weight aqueous sodiumhydroxide solution, and 20 g of N-vinylpyrrolidone are added (feed 1). Feed 2 is prepared from 14 g of 30% strength by weight aqueous hydrogen peroxide solution and 86 g of water.

100 ml of water, 250 ml of feed 1 and 5 ml of feed 2 are initially taken in a 2 l stirred container equipped as in Example 1 and are refluxed while stirring. At the temperature reached, the remainder of feed 1 and feed 2 are metered in simultaneously in the course of 3 hours. Stirring is then continued for a further 2 hours at 100° C. A yellowish, clear viscous polymer solution having a solids content of 22.3% by weight is obtained. The K value of the copolymer is 41.5.

EXAMPLE 6

A mixture of 160 g of acrylic acid and 600 g of water is brought to a pH of 7.8 with 178.5 g of 50% strength by weight aqueous sodium hydroxide solution, and 40 g of N-vinylpyrrolidone are added (feed 1). Feed 2 is prepared from 14 g of 30% strength by weight aqueous hydrogen peroxide solution and 86 g of water.

100 ml of water, 250 ml of feed 1 and 5 ml of feed 2 are initially taken in a 2 l stirred container equipped as in Example 2 and are refluxed while stirring. At the temperature reached, the remainder of feed 1 and feed 2 are metered in simultaneously in the course of 3 hours. Stirring is then continued for a further 2 hours at 100° C. A yellowish, clear viscous polymer solution having a solids content of 21.8% by weight is obtained. The K value of the copolymer is 47.0.

EXAMPLE 7

A mixture of 100 g of acrylic acid and 600 g of water is brought to a pH of 7.9 with 110.5 g of 50% strength by weight aqueous sodium hydroxide solution, and 100 g of N-vinylpyrrolidone are added (feed 1). Feed 2 is prepared from 14 g of 30% strength by weight aqueous hydrogen peroxide solution and 86 g of water.

100 ml of water, 250 ml of feed 1 and 5 ml of feed 2 are initially taken in a 2 l stirred container equipped as in Example 1 and are refluxed while stirring. At the temperature reached, the remainder of feed 1 and feed 2 are metered in simultaneously in the course of hours. Stirring is then continued for a further hours at 100° C. A yellowish, clear viscous polymer solution having a solids content of 21.1% by weight is obtained. The K value of the copolymer is 58.8.

EXAMPLE 8

A mixture of 10 g of acrylic acid and 600 g of water is brought to a pH of 7.8 with 12.5 g of 50% strength by weight aqueous sodium hydroxide solution, and 190 g of N-vinylpyrrolidone are added (feed 1). Feed 2 is prepared from 14 g of 30% strength by weight aqueous hydrogen peroxide solution and 86 g of water.

100 ml of water, 250 ml of feed 1 and 5 ml of feed 2 are initially taken in a 2 l stirred container equipped as in Example 2 and are refluxed while stirring. At the temperature reached, the remainder of feed 1 and feed 2 are metered in simultaneously in the course of 3 hours. Stirring is then continued for a further 2 hours at 100° C. A clear, viscous polymer solution having a solids content of 23.1% by weight is obtained. The K value of the copolymer is 73.4.

EXAMPLE 9

A mixture of 85 g of acrylic acid, 30 g of ethyl acrylate and 600 g of water is brought to a pH of 8.0 with 93.5 g of 50% strength by weight aqueous sodium hydroxide solution, and 85 g of N-vinylpyrrolidone are added (feed 1). Feed 2 is prepared from 4.8 g of tertamyl per-2-ethylhexanoate and 45 ml of ethanol.

100 ml of water, 250 ml of feed 1 and 3 ml of feed 2 are initially taken in a 2 l stirred container equipped as in Example 1 and are heated to 90° C. while stirring. At this temperature, the remainder of feed 1 is metered in over 5 hours and the remainder of feed 2 over 6 hours. Stirring is then continued for a further 1.5 hours at 90° C. A slightly cloudy, viscous polymer solution having a solids content of 24.4% by weight is obtained. The K value of the copolymer is 52.1.

EXAMPLE 10

A mixture of 60 g of acrylic acid, 60 g of dimethylaminopropylmethacrylamide and 600 g of water is brought to a pH of 7.4 with 68 g of 50% strength by weight aqueous sodium hydroxide solution, and 80 g of N-vinylpyrrolidone are added (feed 1). Feed 2 is prepared from 3.5 g of tert-amyl perpivalate and 46 ml of ethanol.

100 ml of water, 250 ml of feed 1 and 3 ml of feed 2 are initially taken in a 2 l stirred container equipped as in Example 1 and are heated to 70° C. while stirring. At this temperature, the remainder of feed 1 is metered in over 4 hours and the remainder of feed 2 over 6 hours. Stirring is then continued at this temperature for a further 1 hour. A clear, viscous polymer solution having a solids content of 25.1% by weight is obtained. The K value of the copolymer is 60.3.

EXAMPLE 11

A mixture of 100 g of acrylic acid, 60g of vinyl isobutyl ether and 600 g of water is brought to a pH of 6.9 with 160 g of 47% strength by weight aqueous potassium hydroxide solution, and 40 g of N-vinylpyrrolidone are added (feed 1). Feed 2 is prepared from 4.2 g of 2,2'-azobis-(2-methylpropionamidine) dihydrochloride and 96 g of water.

100 ml of water, 250 ml of feed 1 and 3 ml of feed 2 are initially taken in a 2 l stirred container equipped as in Example 1 and are heated to 55° C. while stirring. At this temperature, the remainder of feed 1 is metered in over 5 hours and the remainder of feed 2 over 7 hours. Stirring is then continued at this temperature for a further 1 hour. A virtually clear, viscous polymer solution having a solids content of 26.0% by weight is obtained. The K value of the copolymer is 50.1.

EXAMPLE 12

A mixture of 303.1 g of acrylic acid and 600 g of water is brought to a pH of 8.0 with 331 g of 50% strength by weight aqueous sodium hydroxide solution (feed 1). 32.6 g of N-vinylpyrrolidone form feed 2. Feed 3 is prepared from 49.1 g of sodium bisulfite and 73.6 g of water. Feed 4 consists of 9.9 g of sodium persulfate and 40 g of water.

Feeds 1, 2 and 3 are metered simultaneously in the course of 6 hours at 95° C. into a 2 l stirred container equipped as in Example 1, and feed 4 is metered in over 6.25 hours. After the end of feed 3, the mixture is cooled to 80° C. At this temperature, 0.32 g of 2,2'-azobis-(2-methylpropionamidine) dihydrochloride, dissolved in 10 ml of water, is metered in over 0.5 hour and stirring is continued for 1 hour. A colorless, virtually clear viscous polymer solution having a solids content of 32.8% by weight is obtained. The K value of the copolymer is 56.0.

EXAMPLE 13

A mixture of 389 g of a 48% strength by weight aqueous solution of sodium methacrylate, 192 g of N-vinylpyrrolidone, 240.6 g of N-vinylcaprolactam, 845.8 g of a 45% strength by weight aqueous solution of 3-methyl- 1-vinylimidazolium methosulfate (prepared from N-vinylimidazole and dimethyl sulfate), 2.2 g of 2,2'-azobis-(2-methylpropionamidine) dihydrochloride and 500 g of water is initially taken in a 4 l stirred container equipped as in Example 1. The pH of the mixture is 7.8.

6.5 g of 2,2'-azobis-(2-methylpropionamidine) dihydrochloride and 100 g of water form feed 1. Feed 2 is prepared from 8.7 g of 2,2'-azobis-(2-methylpropionamidine) dihydrochloride and 100 g of water.

The initially taken mixture is heated to 75° C. while stirring, and feed 1 is metered in over 4 hours. After the end of feed 1, the total amount of feed 2 is added all at once, and the batch is polymerized at 80° C. (2 hours). Thereafter, the mixture is stirred for a further 2 hours at this temperature with 7% strength by weight aqueous hydrogen peroxide solution, and the final concentration is established with 250 g of water. A virtually clear, viscous polymer solution having a solids content of 38.6% by weight is obtained. The K value of the polymer is 49.

EXAMPLE 14

A mixture of 481.5 g of a 48% strength by weight aqueous solution of sodium methacrylate, 1046.9 g of a 45% strength by weight aqueous solution of 3-methyl-1vinylimidazolium methosulfate (prepared from N-vinylimidazole and dimethyl sulfate), 297.7 g of N-vinylcaprolactam and 2.2 g of 2,2'-azobis-(2-methylpropionamidine) dihydrochloride is initially taken in a 4 l stirred container equipped as in Example 1. The pH of the mixture is 7.5.

6.5 g of 2,2'-azobis-(2-methylpropionamidine) dihydrochloride and 100 g of water form feed 1. Feed 2 is prepared from 8.7 g of 2,2'-azobis-(2-methylpropionamidine) dihydrochloride and 100 g of water.

The initially taken mixture is heated to 75° C. while stirring, and feed 1 is metered in over 4 hours. After the end of feed 1, the total amount of feed 2 is added all at once, and the batch is polymerized at 80° C. (2 hours). Thereafter, the mixture is stirred for a further 2 hours at this temperature with 7% strength by weight aqueous hydrogen peroxide solution, and the final concentration is established with 250 g of water. A virtually clear, viscous polymer solution having a solids content of 44.4% by weight is obtained. The K value of the polymer is 42.

We claim:

1. A process for the preparation of a copolymer, which consists essentially of reacting:
   a) one or more monoethylenically unsaturated monomers containing acid groups;
   b) one or more monomers copolymerizable with said one or more monomers (a), which monomers are selected from the group consisting of N-vinylpyrrolidone, N-vinylcaprolactam and a mixture thereof; and
   c) one or more other monoethylenically unsaturated monomers selected from the group consisting of methyl acrylate, methyl methacrylate, ethyl acrylate, diethyl maleate, dimethylaminoethyl acrylate, dimethylaminoethyl methacrylate, dimethylaminopropyl methacrylamide, vinyl isobutyl ether and a mixture thereof;
   by copolymerizing said monomers in the presence of free radical polymerization initiators, by solution polymerization in water at a pH of at least about 6, and wherein an alkali metal base or alkaline earth metal base or a mixture thereof is used for establishing the pH of the aqueous reaction solution, said free radical initiators having a half life of less than 3 hours at the reaction temperature.

2. The process of claim 1, wherein the amounts of the monomers used in the copolymerization are from 5–95% by weight of (a), from 95–5% by weight of (b) and from 0–30% by weight of (c).

3. The process of claim 1, wherein said monoethylenically unsaturated monomers (a) are selected from the group consisting of acrylic acid, methacrylic acid, dimethacrylic acid, ethylacrylic acid, crotonic acid alkylacetic acid, vinylacetic acid, maleic acid, fumaric acid, itaconic acid, mesaconic acid, methylenemalonic acid, citraconic acid, maleic anhydride, itaconic anhydride, methylenemalonic anhydride, 2-acrylamido-2 -methylpropanesulfonic acid, vinylsulfonic acid, methalkylsulfonic acid, alkylsulfonic acid and a mixture thereof and salts thereof.

4. The process of claim 1, wherein sodium hydroxide, potassium hydroxide or the carbonates or bicarbonates thereof are used for establishing the pH of the aqueous monomer solution.

5. The process of claim 3, wherein said salts are the alkali metal or alkaline earth metal salts thereof.

6. The process of claim 3, wherein said monomers (a) are selected from the grape consisting of acrylic acid, methacrylic acid, maleic acid, itaconic acid, fumaric acid and the lithium, sodium, potassium, calcium, magnesium and strontium salts thereof.

7. The process of claim 1, wherein the pH of said copolymerization is effected at about 7 to 9.

8. The process of claim 1, wherein the polymerization is carried out at from about 40° to 150° C.

9. The process of claim 8, wherein the polymerization is carried out at from 60° to 100° C.

10. The process of claim 1, wherein the initiators are used in an amount of about 0.01 to 20% by wt.

11. The process of claim 1, wherein said copolymer produced has a K value of from 10 to 300.

* * * * *